(12) United States Patent
Pahud et al.

(10) Patent No.: US 10,139,925 B2
(45) Date of Patent: Nov. 27, 2018

(54) CAUSING SPECIFIC LOCATION OF AN OBJECT PROVIDED TO A DEVICE

(71) Applicant: Microsoft Technology Licensing, LLC, Redmond, WA (US)

(72) Inventors: Michel Pahud, Kirkland, WA (US); Pierre P. N. Greborio, Sunnyvale, CA (US); Kenneth P. Hinckley, Redmond, WA (US); William A. S. Buxton, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 13/830,124

(22) Filed: Mar. 14, 2013

(65) Prior Publication Data

US 2014/0247207 A1  Sep. 4, 2014

Related U.S. Application Data

(60) Provisional application No. 61/772,458, filed on Mar. 4, 2013.

(51) Int. Cl.
*G06F 3/03* (2006.01)
*G06F 1/16* (2006.01)
(Continued)

(52) U.S. Cl.
CPC .......... *G06F 3/0304* (2013.01); *G06F 1/1694* (2013.01); *G06F 1/1698* (2013.01); *G06F 3/01* (2013.01); *G06F 3/0346* (2013.01)

(58) Field of Classification Search
CPC ........ G06F 3/0304; G06F 3/0346; G06F 3/01; G06F 1/1694; G06F 1/1698
See application file for complete search history.

(56) References Cited

U.S. PATENT DOCUMENTS 5,146,049 A * 9/1992 Shima .......................... 345/173
5,818,425 A * 10/1998 Want et al. ................... 345/158
(Continued)

FOREIGN PATENT DOCUMENTS

CN 102541256 A 7/2012
CN 102609186 A 7/2012
(Continued)

OTHER PUBLICATIONS

Boring, et al., "Scroll, Tilt or Move It: Using Mobile Phones to Continuously Control Pointers on Large Public Displays", In Proceedings of the 21st Annual Conference of the Australian Computer-Human Interaction Special Interest Group, Nov. 23, 2009, 8 pages.
(Continued)

*Primary Examiner* — Rodney Amadiz

(57) ABSTRACT

Techniques for causing a specific location of an object provided to a shared device. These techniques may include connecting the computing device with an individual device. The individual device may transmit the object to the shared device and displayed at an initial object position on a display of the shared device. The initial object position may be updated in response to movement of the individual device, and the object may be displayed at the updated object position on the display. The object position may be locked in response to a signal, and the object may be displayed at the locked object position.

20 Claims, 7 Drawing Sheets

(51) Int. Cl.
*G06F 3/01* (2006.01)
*G06F 3/0346* (2013.01)

(56) References Cited

U.S. PATENT DOCUMENTS

| | | | |
|---|---|---|---|
| 7,015,932 B1 | 3/2006 | Koike et al. | |
| 7,145,551 B1* | 12/2006 | Bathiche et al. | 345/158 |
| 7,870,496 B1* | 1/2011 | Sherwani | 715/761 |
| 8,122,357 B2* | 2/2012 | Han et al. | 715/717 |
| 8,312,392 B2 | 11/2012 | Forutanpour et al. | |
| 8,447,070 B1* | 5/2013 | Bozarth et al. | 382/103 |
| 8,566,713 B2* | 10/2013 | Toledano et al. | 715/273 |
| 8,725,133 B2* | 5/2014 | Park et al. | 455/418 |
| 9,075,514 B1* | 7/2015 | Karakotsios | G06F 3/04842 |
| 2003/0227438 A1* | 12/2003 | Campbell | G06F 1/1601 345/156 |
| 2004/0070553 A1* | 4/2004 | Youden | G06F 3/1423 345/13 |
| 2007/0130582 A1* | 6/2007 | Chang et al. | 725/37 |
| 2008/0100825 A1* | 5/2008 | Zalewski | A63F 13/06 356/29 |
| 2008/0195735 A1* | 8/2008 | Hodges et al. | 709/227 |
| 2009/0262190 A1* | 10/2009 | Dotchevski | G06F 3/0304 348/143 |
| 2010/0171692 A1* | 7/2010 | Chang et al. | 345/156 |
| 2010/0201879 A1* | 8/2010 | VanDuyn et al. | 348/565 |
| 2011/0151926 A1 | 6/2011 | Kim et al. | |
| 2011/0225553 A1* | 9/2011 | Abramson et al. | 715/863 |
| 2011/0227827 A1 | 9/2011 | Solomon et al. | |
| 2012/0154265 A1* | 6/2012 | Kim et al. | 345/156 |
| 2012/0200759 A1 | 8/2012 | Vartiainen et al. | |
| 2013/0023341 A1* | 1/2013 | Yamanouchi | G06F 3/0304 463/31 |
| 2013/0027315 A1* | 1/2013 | Teng | 345/173 |
| 2013/0141331 A1* | 6/2013 | Shiu et al. | 345/158 |
| 2013/0328892 A1* | 12/2013 | Park et al. | 345/520 |
| 2014/0062874 A1* | 3/2014 | Suggs | G06F 3/0325 345/158 |
| 2014/0145969 A1* | 5/2014 | DeLuca | 345/173 |

FOREIGN PATENT DOCUMENTS

| | | |
|---|---|---|
| JP | 2005190158 A | 7/2005 |
| JP | 2009064409 A | 3/2009 |
| JP | 2011054117 A | 3/2011 |
| JP | 2013531828 A | 8/2013 |
| WO | 2011133590 A1 | 10/2011 |

OTHER PUBLICATIONS

Boring, et al., "Touch Projector: Mobile Interaction through Video", In Proceedings of the SIGCHI Conference on Human Factors in Computing Systems, Apr. 10, 2010,10 pages.

Hardy, et al., "Touch & Interact:Touch-based Interaction of Mobile Phones with Displays", In Proceedings of the 10th International Conference on Human Computer Interaction with Mobile Devices and Services, Sep. 2, 2008, 10 pages.

Wilson, et al., "BlueTable: Connecting Wireless Mobile Devices on Interactive Surfaces Using Vision-Based Handshaking", In Proceedings of Graphics Interface , May 28, 2007, 7 pages.

PCT Search Report dated Jul. 16, 2014 for PCT/US2014/019766, 10 pages.

PCT/US2014/019766 Written opinion of the International Preliminary Examining Authority, dated Feb. 2, 2015, 7 pages.

"International Search Report and Written Opinion", Application No. PCT/US2014/019766, dated Jul. 16, 2014, 10 pages.

"International Preliminary Report on Patentability", Application No. PCT/US2014/019766, dated May 21, 2015, 7 pages.

"Office Action Issued in Japanese Patent Application No. 2015-561485", dated Jan. 11, 2018, 7 Pages.

"Office Action and Search Report Issued in Chinese Patent Application No. 201480012096.1", dated Dec. 20, 2017, 12 Pages.

"Office Action Issued in European Patent Application No. 14717235.7", dated Jun. 7, 2018, 7 pages.

"Second Office Action Issued in Chinese Patent Application No. 201480012096.1", dated Jul. 18, 2018, 6 pages.

"Office Action Issued in Japanese Patent Application No. 2015-561485", dated May 25, 2018, 11 pages.

* cited by examiner

CAUSING SPECIFIC LOCATION OF AN OBJECT PROVIDED TO A DEVICE

CROSS REFERENCE TO RELATED PATENT APPLICATIONS

This patent application claims priority filing benefit from U.S. Provisional Patent Application No. 61/772,458, filed Mar. 4, 2013, which application is hereby incorporated by reference herein, in its entirety.

BACKGROUND

Computing devices are ubiquitous in today's society. Many people own computing devices that can be loaded with applications or software to perform very specific operations. These devices, when loaded with proper software, may be used to control devices, exchange information with other devices, and perform other functions.

When communicating data from a first computing device to a second computing device, the communicated data is often stored and/or displayed at default locations on the second device that are determined by the second device (i.e., the receiving device). At best, a user of the first computing device may specify a storage location for the data on the second device, such as by selecting a folder used to store the data.

SUMMARY

Described herein are techniques and systems that allow positioning of an object that is received from an individual device (e.g., a mobile computing device, etc.) and made available for display on a shared device (e.g., a shared display, etc). The positioning of the object on the shared device may be based in part on movement of a user associated with the individual device and/or movement of the individual device.

Example techniques may include creating a communication connection between a shared device and an individual device. After the connection is established between the devices, an object that is selected on the individual device may be transmitted from the individual device to the shared device, and displayed at an initial object position on a display of the shared device. The object position may be updated in response to movement of the individual device or a user operating the individual device. The object position may be locked in response to a triggering event, and the object may be displayed, at least temporarily, at the locked object position by the shared device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, in part, to operations used to transmit and position an object between an individual device (e.g., a mobile computing device, etc.) and a shared device (e.g., a shared display, etc.). Embodiments of the present disclosure provide seamless and intuitive copy-paste and position controls, from the individual device, to position the object on a display associated with the shared device. Unlike conventional technologies that enable a user to "flick" objects to a display, but offer no positioning control by the user once the object is received on the display, embodiments of the present disclosure enable a user that transmitted the object to precisely position the object on a display after the object is received by the display.

In some aspects of this disclosure, the shared device may create a communication connection with the individual device by performing a connection protocol, such as a handshake, pairing of information, exchange of credentials, and/or by using other connection protocols. The shared device may receive the object form the individual device. For example, the individual device may transmit the object to the shared device using a hardware address of the shared device that was exchanged during the connection protocol. The shared device may display the object at an initial object position.

In some embodiments, the shared device may update the position of the object by detecting a position of the individual device or user as a control position, and then updating the object position in response to a change in the control position. The shared device may lock the object at a particular object position in response to a trigger event, such as receipt of a signal (e.g., a termination signal, etc.), an expiration of a predetermined amount of time, discontinued movement of the individual device, and/or other triggering events.

In various embodiments, the individual device may provide position information to allow the shared device to position the object on the display of the shared device. For example, the position information may include imagery created by the individual device, where the imagery includes the object and reference points associated with the shared device. The shared device may then use the position information to position the object on the display associated with the shared device.

Illustrative Environment

Figure 1:
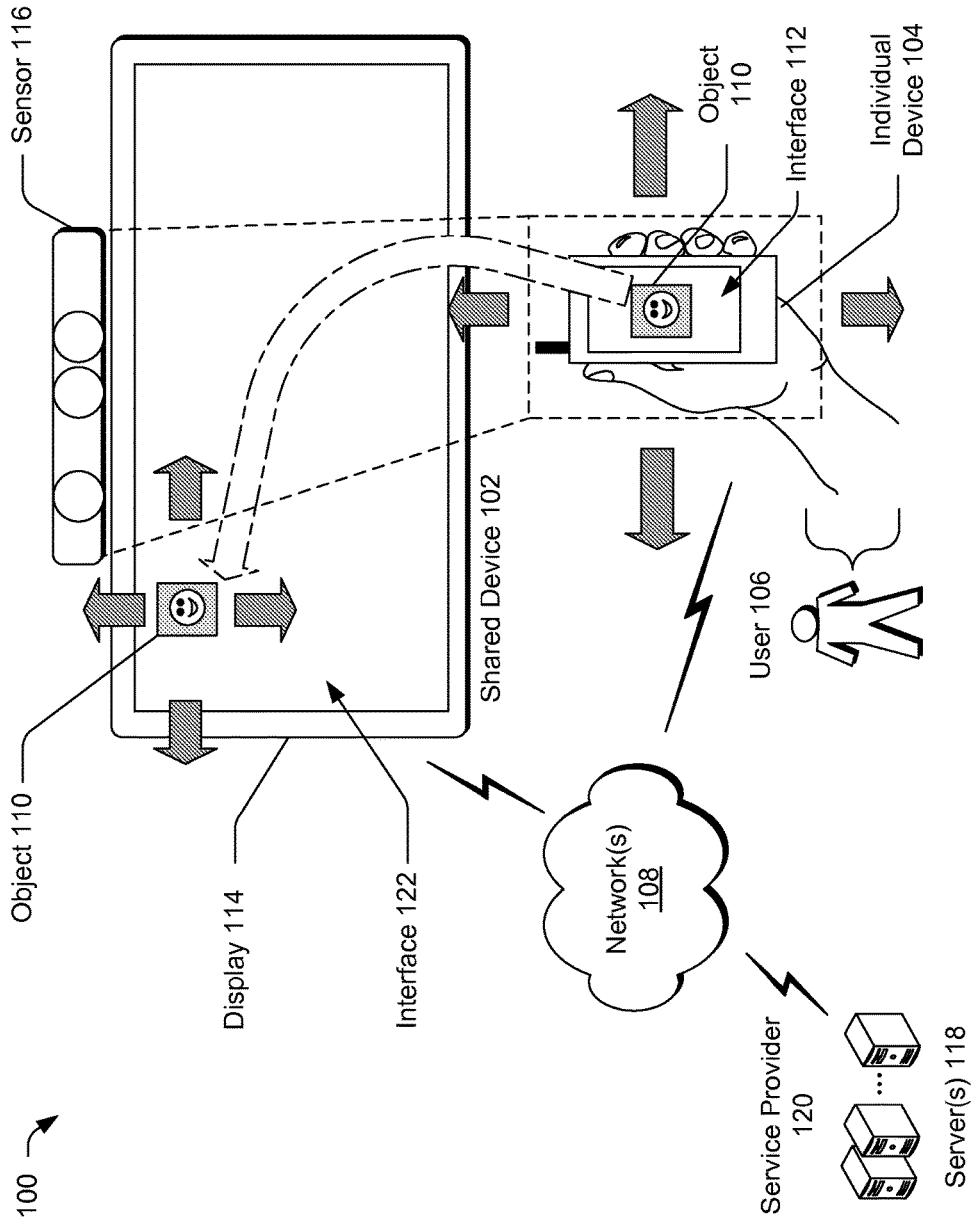
FIG. 1 illustrates an example computing environment for causing a specific location of an object provided to a computing device.

FIG. 1 illustrates an example computing environment 100 in which an object may be transmitted from an individual device, and placed in a particular position on a display associated with a shared device. In some embodiments, the environment 100 may include a shared device 102 that is in communication with an individual device 104, which is operated by a user 106. The shared device 102 may be a general purpose computer, one or more servers, a set-top box, a game console, or any other computing device capable of exchanging data with another device (e.g., a mobile telephone) and producing outputs (e.g., a visual representation). In these and other instances, the shared device 102 may be accessed by one or more computing devices (e.g., the individual device 104).

In some instances, the individual device 104, meanwhile, may be a mobile computer, a mobile telephone (e.g., smart phone), a personal computer, a laptop computer, a portable digital assistant (PDA), a game console, a personal media player (PMP), a digital still camera, a digital video camera, a personal navigation device, or any other computing device capable of exchanging data with another device (e.g., a sensing device) and producing outputs (e.g., a visual representation), which can be used with various devices (e.g., a display).

In some embodiments, the shared device 102 may be in communication with the individual device 104 and one or more other computing devices. In these instances, the individual device 104 and other computing devices may present and/or share objects on a display associated with the share device 102. For example, the individual device 104 and other computing devices may copy and paste the objects to the shared device 102, and display the objects at desired positions on the display. The objects may be applications, services, documents, data, graphs, photos, multimedia (e.g., text, audio, images, animation, video), games, emails, online chat records, social networking profiles, postings, and other files that users may wish to share with others. In some embodiments, the selection of the objects may include a selection of same type of objects and/or a selection that contains a combination of different type of objects. In some embodiments, the selection may include a subset of an application (i.e., a dialog box).

The shared device 102 may establish a connection with the individual device 104 when the individual device 104 is in proximity of the shared device 102. The connection may be initialized by the shared device 102 or the individual device 104. In some instances, the connection may be established via network 108. The network 108 may include any one or combination of multiple different types of networks, such as cable networks, the Internet, and wireless networks (e.g., Bluetooth®, Wi-Fi, mobile telephone networks, etc.).

In some embodiments, the user 106 may select an object 110 on an interface 112 of the individual device 104, and then copy the object 110 to a display 114. After receiving the selection of the object 110, the individual device 104 may transmit the object 110 to the shared device 102. For example, the individual device 104 may transmit the object 110 to the shared device 102 using a hardware address of the shared device that was exchanged during the connection protocol. The shared device 102 may display the object 110 on an initial object position of the display 114. In some instances, the initial object position may be determined based on a predetermined rule or context, such as a task that the shared device 102 or the individual device 104 is operating.

In some embodiments, the initial object position may be determined based on a position of the user 106 and/or the individual device 104 in relation to the sensor 116 or the display 114. In these instances, the initial object position may be associated with reference features of the user 106 and/or the individual device 104. For example, the display 114 may include multiple displays, and the initial object position may be on a display of the multiple displays to which the user 106 or the individual device 104 is aiming.

In some embodiments, the shared device 102 may detect a position of the individual device 104 via a sensor 116. In these instances, the sensor 116 may detect and/or track movement of the individual device 104 and/or an appendage of the user 106. For example, the sensor 116 may be a motion detection sensor that is capable of tracking movement of specific items (e.g., the individual device 104, etc.) and/or tracking movement of people (e.g., the user 106, etc.). Accordingly, the user 106 may control the object position of the object on the display 114 by moving the individual device 104 and/or the appendage, which is tracked by the sensor 116. The shared device 102 may update the object position in response to the movement of the individual device 104 received by the sensor 106, and then display the object 110 at the updated object position.

The shared device 102 may lock the object at a particular object position in response to a trigger event, such as receipt of a signal (e.g., a termination signal, etc.), an expiration of a predetermined amount of time, discontinued movement of the individual device or the user, and/or other triggering events. For example, the object position may be updated until the shared device 102 receives a stop signal (e.g., the user 106 releasing the finger from the individual device 104, etc.). Once receiving the stop signal, the shared device 102 may lock the object position and display the object 110 at the locked object position.

In various embodiments, the individual device 104 may transmit object positioning information to the shared device 102 that enables positioning of the object 110 on the display 114 without use of the sensor 116. In some embodiments, the object position information may include imagery captured by a camera of the individual device 104. For example, the imagery may include reference features associated with the display 114, which may be overlaid with the object 110 rendered on the individual device 104. The overlaid object may provide position information with respect to the reference features, which may enable the shared device 102, after analysis of the objet position information, to position the object 110 at specific locations on the display. As the user 106 moves the individual device 104 (and thus the camera), the relative position of the object and reference features may change. The individual device 104 may continually update and transmit the object position information to the shared device 102 until occurrence of a triggering event. Upon receiving the object position information, the shared device 102 may display the object 110 at an updated object position that corresponds to the object position information. The shared device may lock the object at a particular object position in response to a trigger event. For example, the object position is updated until the individual device 104 stops sending the object position information. The shared device 102 may then lock the object position and display the object 110 at the locked object position.

In some embodiments, the environment 100 may also include server(s) 118 associated with a service provider 120 that provides services (e.g., cloud storage, external content, etc.) to the shared device 102 and/or the individual device 104. In some instances, while interacting with the shared device 102, the individual device 104 may access the services of the service provide 120 via the network 108. For example, the user 106 may request a mapping service from the service provider 120. The shared device 102 may receive mapping information (e.g., a map) and present the map information on the display 114. Some mapping information may also be provided to the individual device 104, although this mapping information may be different than the mapping information provided to the shared device 102.

Illustrative Architecture

Figure 2:
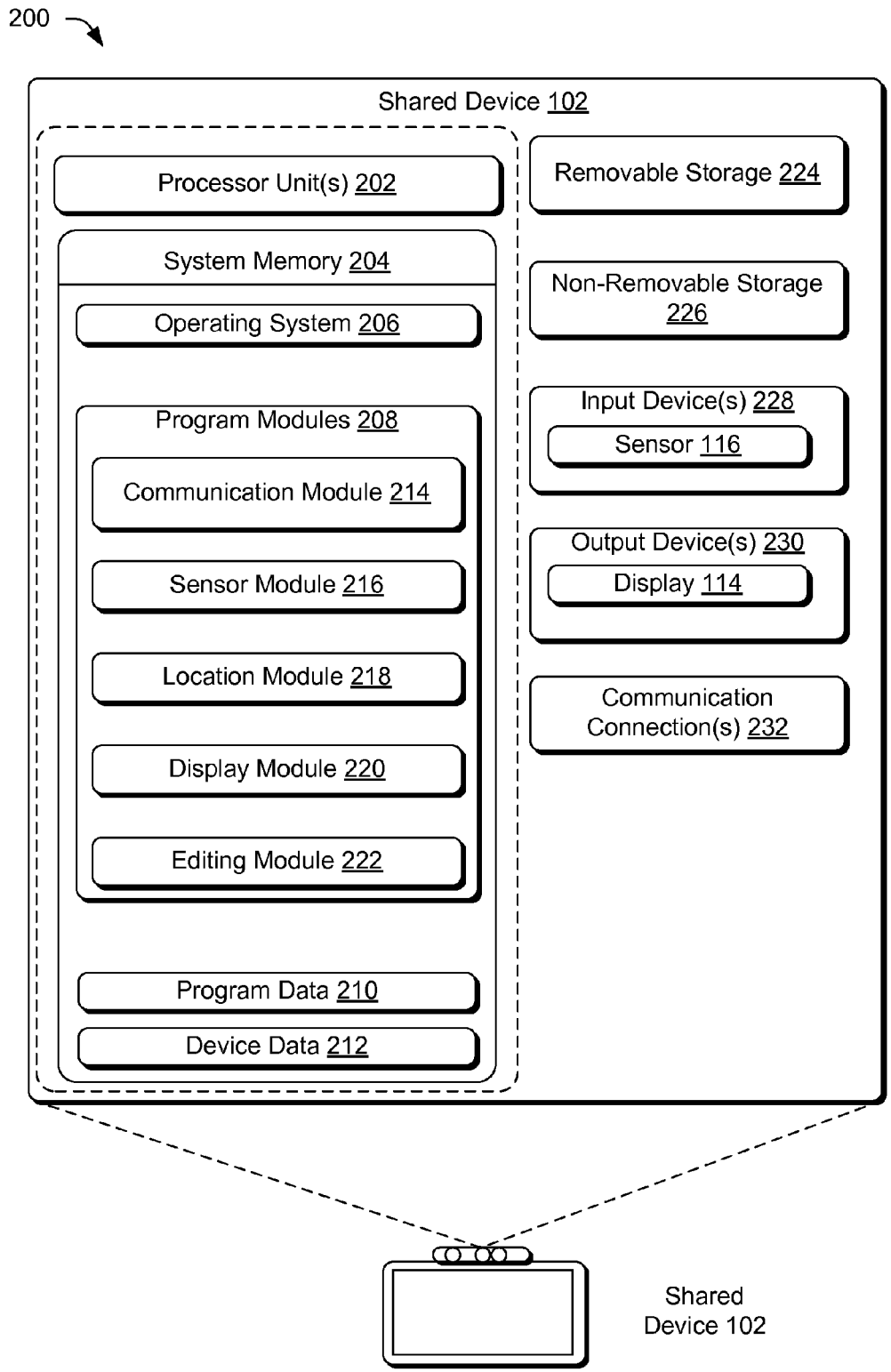
FIG. 2 illustrates an example architecture of the shared device shown in FIG. 1.

FIG. 2 illustrates an example architecture of a shared device shown in FIG. 1. The shared device 102 shown in FIG. 2 and the individual device 104 are only examples of possible computing devices and are not intended to suggest any limitation as to the scope of use or functionality of the computer and network architectures. The shared device 102 and the individual device 104 are not intended to be interpreted as having any dependency or requirement relating to any one or combination of components illustrated in the example computing device.

Alternatively, or in addition, the functionally described herein regarding the shared device 102 and the individual device 104 may be performed, at least in part, by one or more hardware logic components. For example, and without limitation, illustrative types of hardware logic components that may be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some embodiments, the shared device 102 may include at least one processing unit 202 and system memory 204. Depending on the exact configuration and type of computing device, the system memory 204 may be volatile (such as RAM), non-volatile (such as ROM, flash memory, etc.) or some combination of the two. The system memory 204 typically includes an operating system 206, one or more program modules 208, and may include program data 210 as well as device data 212. In some instances, the device data 316 may store information associated with devices (e.g., the individual device 104) that have connected and/or are to be connected with the shared device 102. The program modules 208 may include a communication module 214, a sensor module 216, a location module 218, and a display module 220, and a editing module 222, each discussed in turn.

The communication module 214 may be configured to communicate with devices such as the individual device 104 and/or the server 118. In some embodiments, the communication module 214 may initialize and establish a connection with the individual device 104 via the network 108. For example, the communication module 214 may demodulates Bluetooth signals and/or control the sates and modes of a Bluetooth device, such as the individual device 104. In some instances, the communication module 214 may perform and/or establish a handshake with the individual device 104 to create a connection such as Bluetooth link, when the individual device is in proximity of the shared device. In these instances, authentication credentials may be exchanged between the shared device 102 and the individual device 104 during the handshake.

After the connection is established between the shared device 102 and the individual device 104, the communication module 214 may receive the object 110 from the individual device 104 via the communication protocol established between the devices. The received object 110 may be displayed by the display module 220 at an initial object position on the display 114. In some embodiments, the display module 220 may show a shadow at the initial object position on the display 114 to represent the object 110. The shadow may be moved on the display 114 in response to movement of the user 106. The shadow may include a rendering of the object 110, a semi-transparent rending of the object 110, a placeholder, and/or other information/imagery. In some embodiments, the display 114 may include multiple displays and/or other devices, and that the shadow may appear on an appropriate display based on where the individual device is aiming.

In some embodiments, the initial object position may be determined based on a predetermined rule and/or context, such as a task that the shared device 102 and/or the individual device 104 are operating. In some instances, the initial object position may also be determined based on a position of the individual device 104 or an appendage of the user 106 in relation to a distance to the display.

The sensor module 216 may be configured to detect a control position, such as a position of the individual device 104 and/or an appendage of the user 106. For example, combining with the sensor 116, the sensor module 216 may perform three dimension (3D) motion capture of partial or full-body, facial recognition and voice recognition. In some embodiments, the sensor module 216 may detect and/or track one or more changes of the control position. In response to the changes, the location module 218 may update the object position of the object 110 presented on the display 114. Then, the location module 218 may lock the object 110 at the updated object position on the display 114 in response to a triggering event. The triggering event may be a command transmitted after the user 106 performs a stop gesture, such as releasing his/her finger from a touch screen of the individual device 104, after a predetermined amount to time, after a stop in movement, and so forth.

In some embodiments, the sensor module 216 may track multiple users operating multiple individual devices via the sensing device 106. In some instances, the shared device 102 may track the multiple users by identifying features of individual users and associate the individual users with one or more individual devices that the individual users is are operating. For example, the shared device 102 may identify an individual user based on user characteristics (e.g., voice, facial features and/or body features, etc.) and/or based on other tracking information associated with the individual user (e.g., device identifiers, marker identifiers, self registration, etc.) of the individual user.

Figure 7:
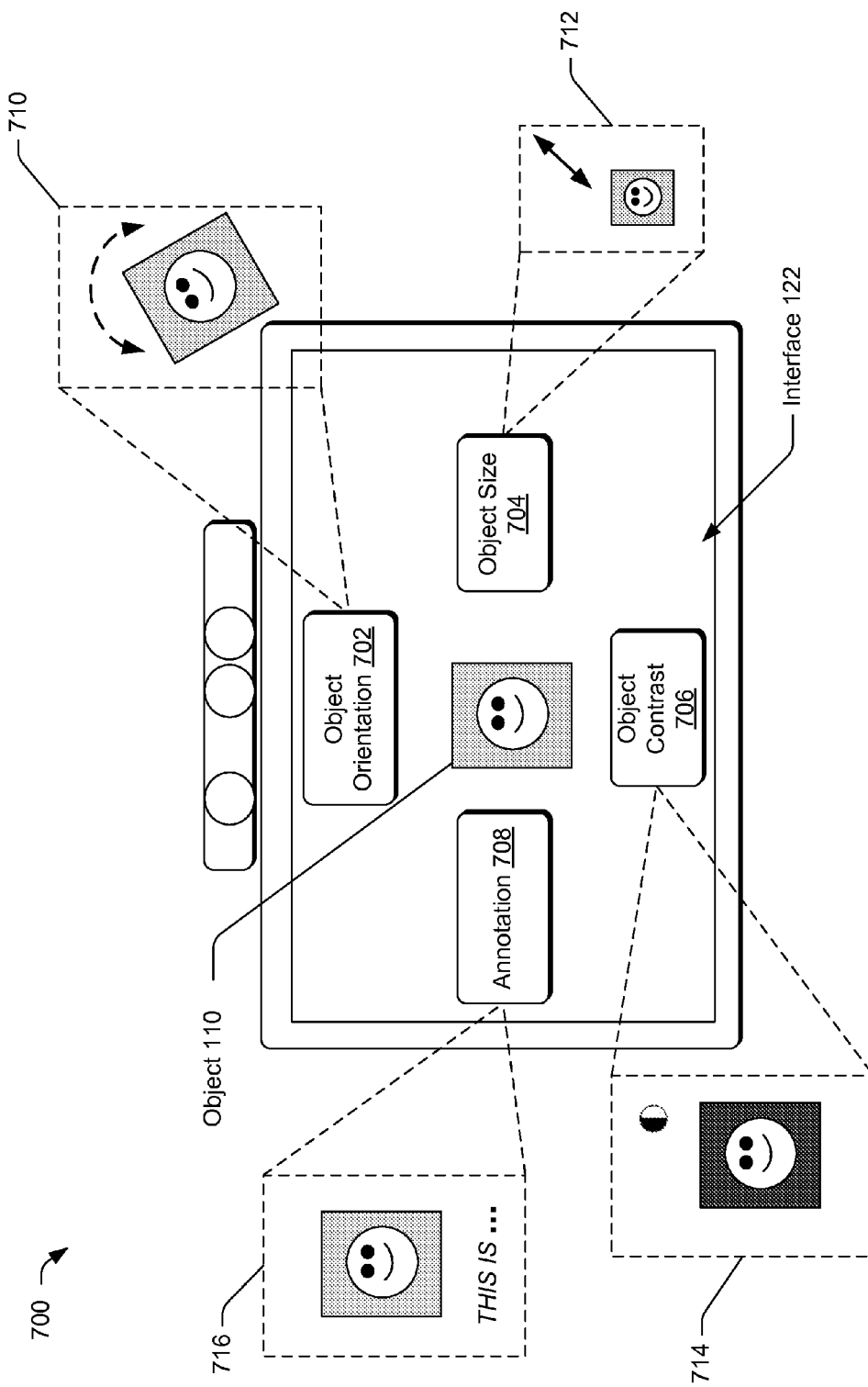
FIG. 7 illustrates an example user interface for editing objects transmitted to a computing device.

The program modules 208 may also include an editing module 222, which is configured to edit the object 110 based on movement of the individual device 104 or gestures of a user appendage after the object is locked, which is discussed in greater detail in FIG. 7. For example, the user 106 may rotate the object 110, change a size and/or contrast of the objection 110, crop and/or leave only a portion behind of the object 110, and/or add annotation associated with the object 110.

In some embodiments, the operating system 206 includes a component-based framework that supports components (including properties and events), objects, inheritance, polymorphism, reflection, and the operating system 206 may provide an object-oriented component-based application programming interface (API). Again, a terminal may have fewer components but will interact with a computing device that may have such a basic configuration.

The shared device 102 may have additional features or functionality. For example, the shared device 102 may also include additional data storage devices (removable and/or non-removable) such as, for example, magnetic disks, optical disks, or tape. Such additional storage is illustrated in FIG. 2 by removable storage 224 and non-removable storage 226. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 204, the removable storage 224 and the non-removable storage 226 are all examples of computer storage media. Computer storage media includes RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that may be used to store the desired information and which may be accessed by the shared device 102. Any such computer storage media may be part of the shared device 102. Moreover, the computer-readable media may include computer-executable instructions that, when executed by the processor unit(s) 202, cause the shared device 102 to perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The shared device 102 may also have input device(s) 228 such as keyboard, mouse, pen, voice input device, touch input device (e.g., stylus, pen, etc.), touch screen device, navigation devices (e.g., track pad, mouse, etc.) etc. In some embodiments, input methods may be implemented via Natural User Interface (NUI). NUI may include any interface technology that enables a user to interact with a device in a "natural" manner, free from artificial constraints imposed by input devices such as mice, keyboards, remote controls, and the like. Examples of NUI methods may include those relying on speech recognition, touch and stylus recognition, gesture recognition both on screen and adjacent to the screen, air gestures, head and eye tracking, voice and speech, vision, touch, gestures, and machine intelligence. Categories of NUI technologies may include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

In some embodiments, the shared device 102 may include the sensor 116 that receives and/or responses to an input signal generated via methods such as NUI. For example, the sensor 116 may be a motion sensing input device that receives and/or responses to signals used for partial or full-body 3D motion capture, facial recognition and voice recognition. In some instances, the sensor 116 may track one or more users in various conditions (e.g., complete darkness) by tracking users' bodies (e.g., skeletons and appendage). The appendage may include arms, legs, and heads of the users. In some instances, the representation may be tracked via depth-sensing or optical flow techniques, and does not necessarily require identification of particular body parts.

The shared device 102 may also output device(s) 230 such as a display (e.g., the display 114), speakers, printer, etc. may also be included. The shared device 102 may also contain communication connections 232 that allow the device to communicate with other computing devices (e.g., the individual device 104), such as over a network such as the network 108.

Figure 3:
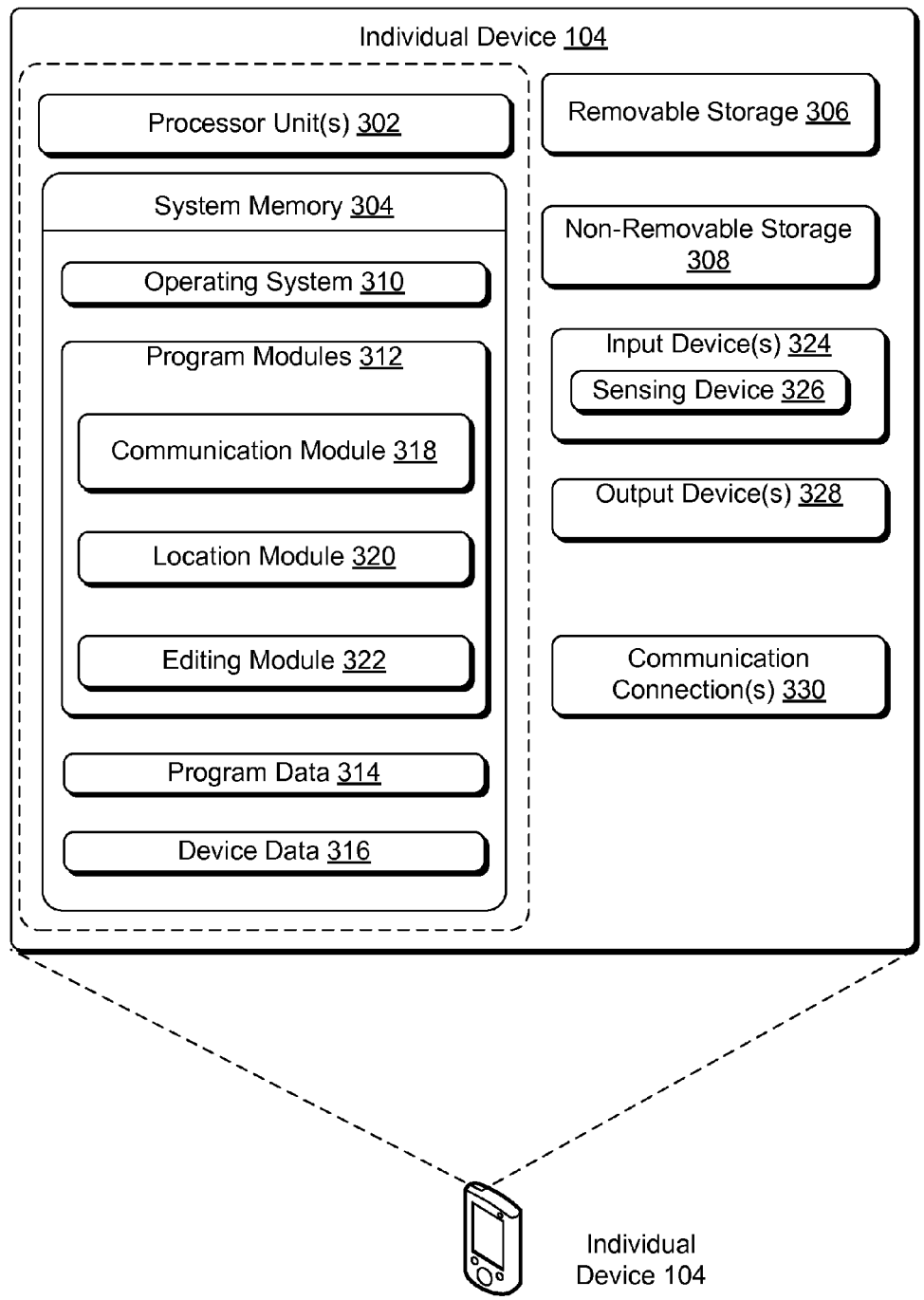
FIG. 3 illustrates an example architecture of the individual device shown in FIG. 1.

FIG. 3 illustrates an example architecture 300 of an individual device shown in FIG. 1. In some embodiments, the individual device 104 may include at least one processing unit 302 and system memory 304. Depending on the exact configuration and type of computing device, the system memory 304 may be volatile (such as RAM), non-volatile (such as ROM, flash memory, etc.) or some combination of the two. The individual device 104 may also include additional data storage devices such as removable storage 306 and non-removable storage 308. The system memory 304, the removable storage 306 and the non-removable storage 308 are all examples of computer storage media.

The system memory 304 typically includes an operating system 310, one or more program modules 312, and may include program data 314 as well as device data 316. In some instances, the device data 316 may store information associated with devices (e.g., the shared device 102) that have connected and/or are to be connected with the individual device 104. The program modules 312 may include a communication module 318, a location module 320, and an editing module 322, each discussed in turn.

The communication module 318 is configured to communicate with devices such as the shared device 102 and/or the server 118. In some embodiments, the communication module 318 may initialize and establish a connection with the shared device 102 via, for example, a Bluetooth connection, the network 108, or another connection protocol.

After the connection is established between the shared device 102 and the individual device 104, the communication module 214 may receive a selection of the object 110 from the user 106, and transmit the object to the shared device 104 via a communication protocol established with the shared device 102.

The location module 320 is configured to locate an object position on the display 114 of the shared device 102. In some embodiments, the object position may include a position of the object 110 in relation to reference features of the display 114. The reference features may be captured by a camera of the individual device 104. In these instances, the reference features may be determined based on objects shown on the display 114 such as images or icons shown on the display 114. In some instances, the reference features may be determined based on an appearance feature of the display such as a frame of the display 114.

The location module 320 may also update the object position in response to movement of the individual device 104 and/or an appendage of the user 106. Accordingly, the user 106 may control the object position of the object on the display 114 by moving the individual device 104 and/or the appendage. Information of the object position and/or the updated object position may be transmitted to the shared device 102 by the communication module 318, and the shared device 102 may then display the object at the object position or the updated object position on the display 114. The object position is updated until an occurrence of a triggering event. For example, the triggering event may be a command transmitted to the shared device 102 by the communication module 318 to lock the object position and display the object 110 at the locked object position.

In some embodiments, the user 106 may be given an impression of holding the object 110 by providing background imagery of the display 114 as imagery from a camera of the individual device 104. Accordingly, the user 106 may precisely control the object position by moving the individual device 104. In some instances, the location module may track a control position of the individual device 104 relative to the display 114 using vision, audio and/or other approaches that communicate with the shared device 102.

The program modules 312 may also include an editing module 322, which is configured to edit and/or enable editing the object 110 based on movement of the individual device 104 or gestures of a user appendage after the object is locked, which is discussed in greater detail in FIG. 7. For example, the user 106 may rotate the object 110, change a size and/or contrast of the objection 110, crop and/or leave only a portion behind of the object 110, and/or add annotation associated with the object 110.

The individual device 104 may also have input device(s) 324 such as a touch screen device, physical buttons (menu buttons, keyboard, etc.), touch input devices (stylus, pen, etc.), a voice input device, a camera, a light sensor, a microphone, etc. In some embodiments, input methods may be implemented via NUI. In some embodiments, the individual device 104 includes the sensing device 326, such as a camera In some embodiments, the individual device 104 includes output device(s) 328 such as a display (e.g., a touch screen), speakers, etc. The individual device 104 may also contain communication connections 330 that allow the device to communicate with other computing devices (e.g., the shared device 102), such as over a network. These networks may include wired networks as well as wireless networks such as the network 108.

Illustrative Operations

Figure 4:
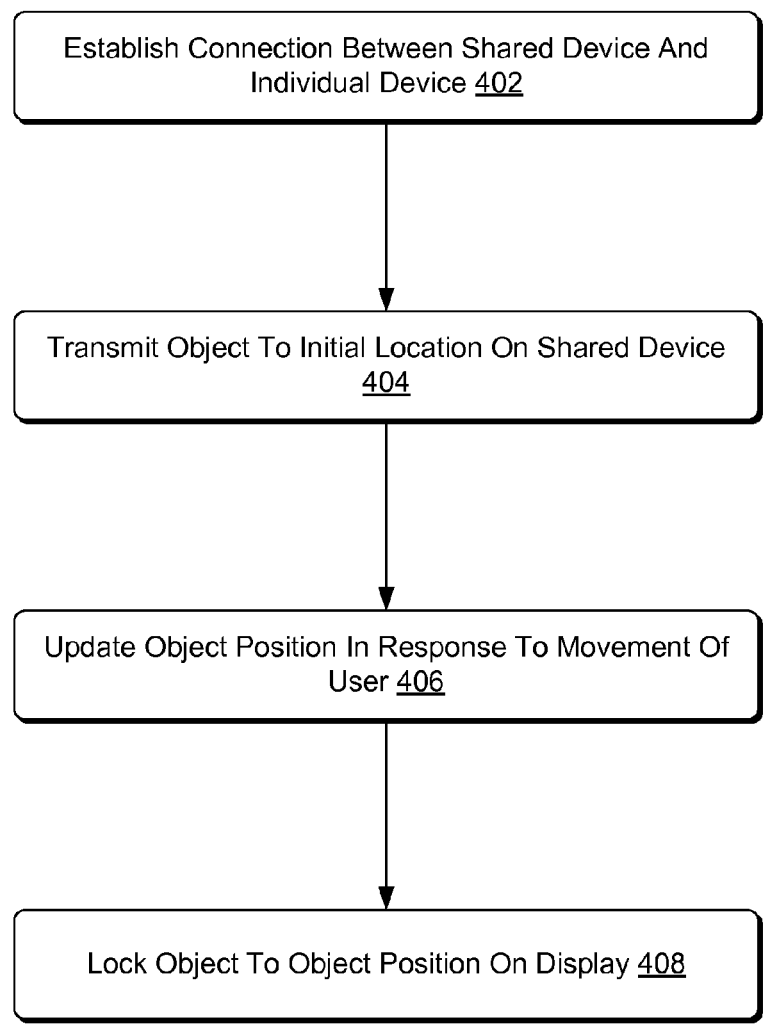
FIG. 4 illustrates an example process to cause a specific location of object provided to a computing device.

FIG. 4 illustrates an example process 400 for causing specific location of object provided to a shared device. The process 400 and other processes described throughout this disclosure, including the processes 500 and 600, are illustrated as collections of blocks in logical flow graphs, which represent sequences of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 402, the shared device 102 and the individual device 104 may establish a connection to enable communication between the shared device 102 and the individual device 104. For example, the shared device 102 may establish a connection with the individual device 104 by performing a connection protocol, such as a handshake or pairing of information, exchange of credentials, etc. The connection may be initiated by either device. In some embodiments, the devices may initiate the connection when the devices are within a predetermined distance from one another, touching each other, etc.

At 404, an object may be transmitted from the individual device 104 to the shared device 102 and located on the display 114 at an initial object position (position on the display).

At 406, the object position may be updated in response to movement of the individual device 104 and/or an appendage of the user 106. The movement may be detected by the shared device 102, the individual 104, or both. For example, the user 110 may move up or down in respect to other objects on the display 114. For example, the shared device 102 may use the sensor 116 to detect the movement with respect to the sensor 116, the display 114, or another location. The individual device 110 may determine the distance based on information from the sensing device 326, which may detect the movement based on reference features associated with the display 114.

At 408, the object position may be locked in response to a triggering event, and the object 110 may be displayed at the locked object position on the display 114. In some embodiments, after the object position is locked, the user 106 may edit the object 110, for example, to change and/or add orientation, size, contrast, or annotation, which is discussed in greater detail in FIG. 7. In some embodiments, the object may be moved again after being locked based on another command.

Figure 5:
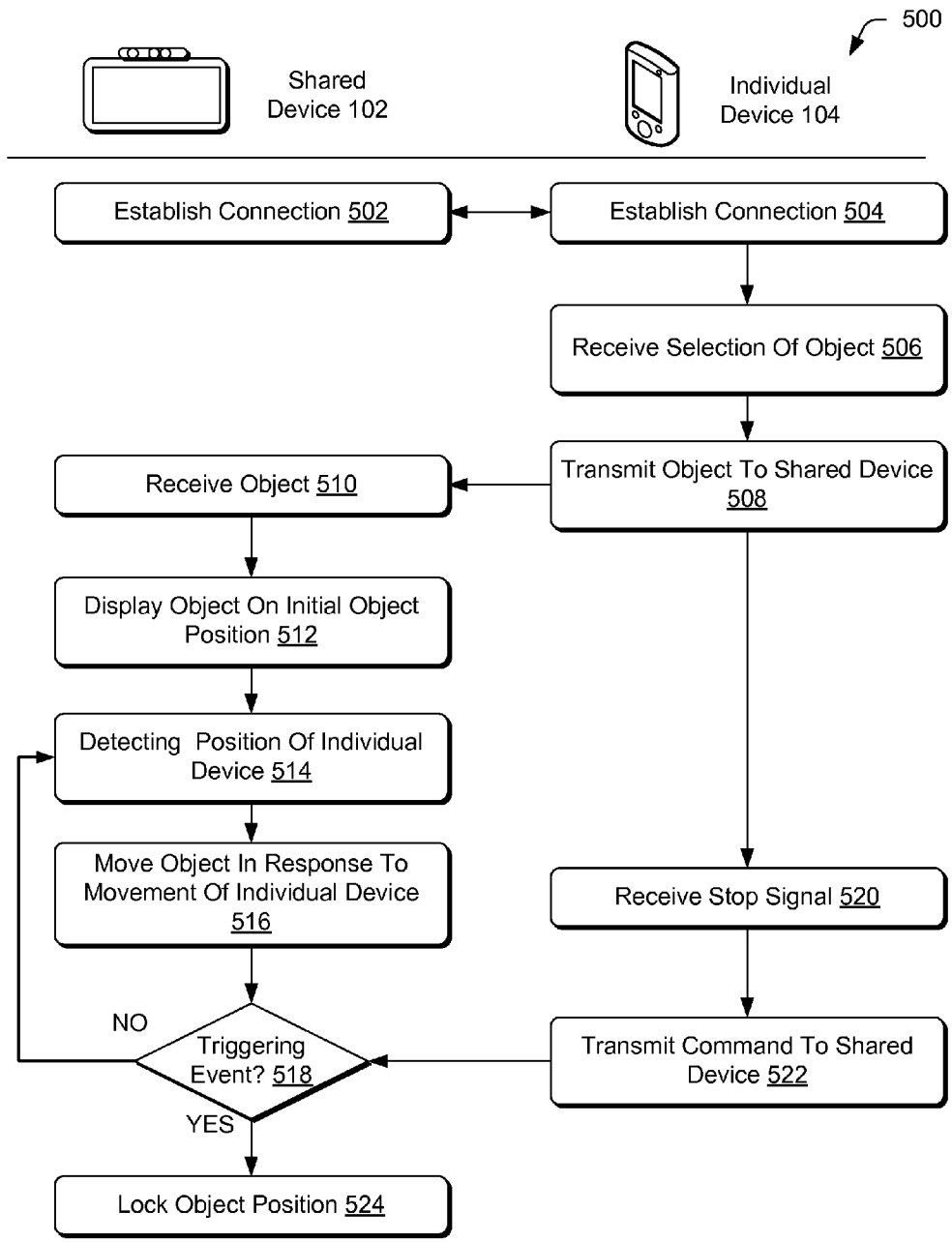
FIG. 5 illustrates an example process to cause a specific location of object provided to a computing device, where the shared device detects a position of the individual device or the user.

FIG. 5 illustrates an example 500 process to cause a specific location of object provided to a computing device, where the shared device 102 detects a position of the individual device 104 or the user.

At 502 and 504, the shared device 102 and the individual device 104 may establish a connection to enable communication between the shared device 102 and the individual device 104. For example, the shared device 102 may establish a connection with the individual device by performing a connection protocol, such as a handshake or pairing of information, exchange of credentials, etc. The connection may be initiated by either device. In some embodiments, the devices may initiate the connection when the devices are within a predetermined distance from one another, touching each other, etc.

At 506, the individual device 104 may receive selection of the object 110. For example, the user 106 may select the object 110 by touching a screen associated with the individual device 104 with one or more fingers and/or a stylus. In some instances, the selection of the object 110 may be implemented by speech recognition of an audio input from the user 106. The object 110 may be transmitted to the shared device 102 at 508.

After receiving the object at 510, the shared device 102 may display the object 110 at an initial object position at 512. In some instances, the initial object position may be determined based on a predetermined rule or context, such as a task that the shared device 102 or the individual device 104 is operating.

At 514, the shared device 102 may detect a position associated with the individual device 104 and/or the user 106 (i.e., a control position). For example, the sensor 116 of the shared device 102 may track the individual device 104 or a user appendage associated with the individual device 104 using a motion sensor.

At 516, in response to changes of the control position associated with the individual device 104, the shared device 102 may move the object 110 on the display 114.

At 518, the shared device 102 may determine whether a triggering event has occurred. The triggering event may be a signal, lack of movement for a predetermined amount of time, an expiration of an amount of time, etc. If the triggering event occurs, the individual device 104 may transmit a command, generated at 520, to the shared device at 522. After receiving the command (i.e., the "YES" branch of operation 518), the shared device 102 may lock the object position and display the object 110 at the locked position of the display at 524. However, if the triggering event does not require a command, then the object may be locked at the operation 524 without occurrence of the operations 520 and 522.

If the stop signal is not received (i.e., the "NO" branch of operation 518), the operations 514-516 may be performed by a loop process.

Figure 6:
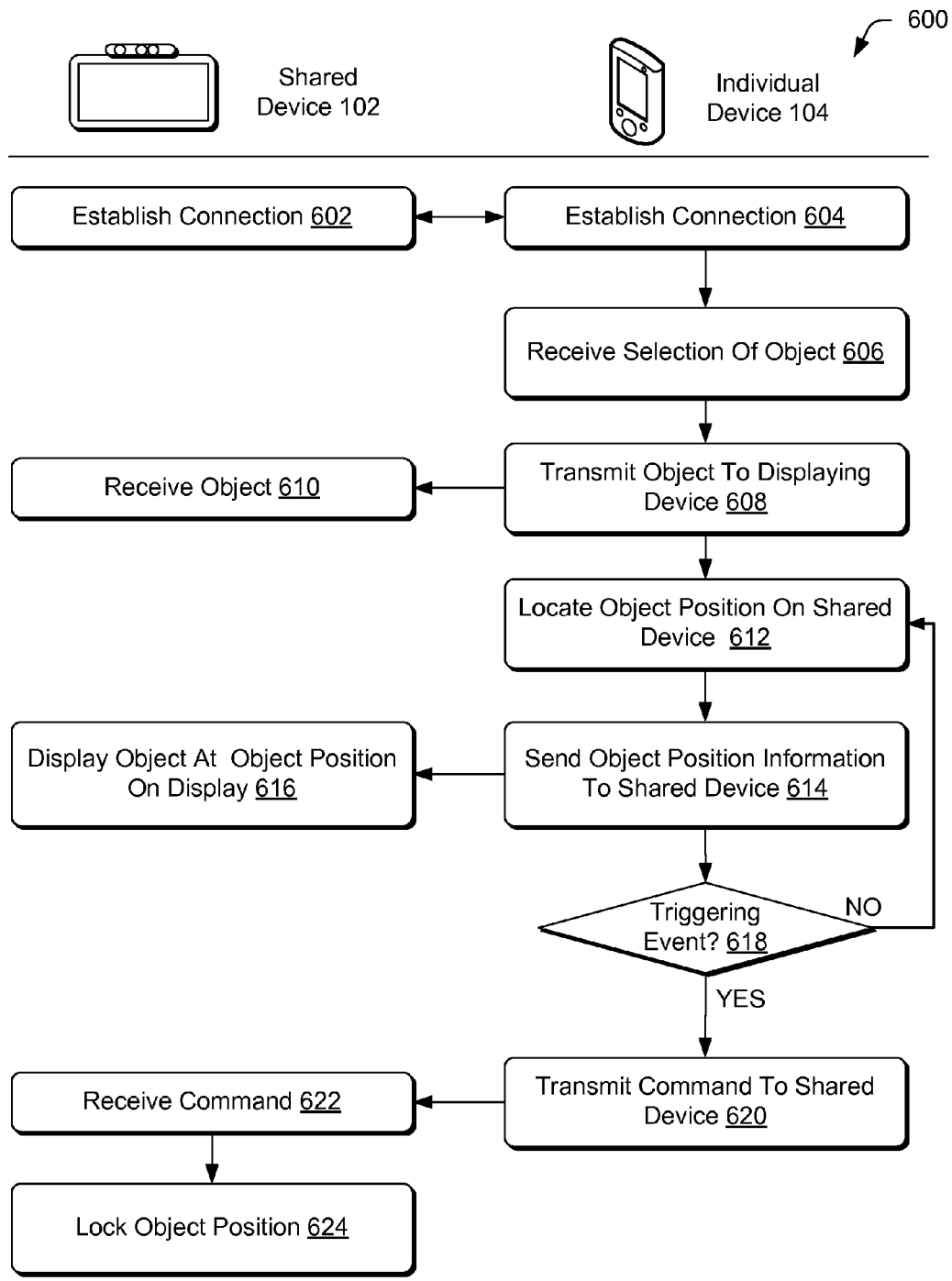
FIG. 6 illustrates an example process to cause a specific location of object provided to a computing device, where the individual device provides position information to the shared device.

FIG. 6 illustrates an example 600 process to cause a specific location of object provided to a computing device, where the individual device 104 provides position information to the shared device 102.

At 602 and 604, the shared device 102 and the individual device 104 may establish a connection to enable communication between the shared device 102 and the individual device 104. For example, the individual device 104 may establish a connection with the individual device by performing a connection protocol, such as a handshake or pairing of information, exchange of credentials, etc. The connection may be initiated by either device. In some embodiments, the devices may initiate the connection when the devices are within a predetermined distance from one another, touching each other, etc.

At 606, the individual device 104 may receive selection of the object 110, which may be transmitted to and received by the shared device 102 at 608 and 610 respectively.

At 612, the individual device 104 may locate an object position on the display 114 of the shared device 102. In some embodiments, the object position may include a position of the object 110 in relation to reference features of the display 114. For example, by showing the display 114 as a background image captured by a camera, the individual device 104 may enable the user 106 to determine where the object 110 is placed on the display 114.

At 614, the individual device 104 may update the object position in response to movement of movement of the individual device 104 and/or an appendage of the user 106.

At 616, the individual device 104 may transmit the information associated with the object position and/or the updated object position to the shared device 102. After receiving the information at 618, the shared device 102 may display the object 110 at the update object position on the display 114.

At 618, the individual device 104 may determine whether a triggering event has occurred. The triggering event may be a signal, lack of movement for a predetermined amount of time, an expiration of an amount of time, etc. If the triggering event occurs, the individual device 104 may transmit a command to the shared device at 620. After receiving the command (i.e., the "YES" branch of operation 618), the shared device 102 may lock the object position and display the object 110 at the locked position of the display at 624. If the triggering event has not occurred (i.e., the "NO" branch of operation 618), the operations 612-618 may be performed by a loop process.

Illustrative Interface

FIG. 7 illustrates an example user interface (UI) 700 for editing objects transmitted to the shared device 102. The UI 700 may be presented by the shared device 102 or the individual device 104. While FIG. 7 illustrates one example UI, it is to be appreciated that multiple other graphic or non-graphic user interfaces may be employed to edit objects transmitted to the shared device 102.

The UI 700 may include one or more option sections, for example, an object orientation 702, an object size 704, an object contract 710, and an annotation 712. The user 106 may select the one or more option sections to edit the object 110 after the object 110 is locked at the object position of the display 114. In some embodiments, the one or more options sections may be surfaced and cycled one at a time to allow the user 106 to select one of these option sections.

In some embodiments, the user 106 may select the locked object 110, and then perform operations (e.g., editing or removing) associated with the object 110. In some embodiments, to facilitate object selection, the display 114 may show a shadow at a particular position in response to a trigger event, such as receipt of a signal (e.g., an initialization signal, etc.), an expiration of a predetermined amount of time, and/or other trigger events. In some instances, the user 106 may select the object 110 by moving the shadow onto the object 110 (e.g., via the individual device 104), making a gesture (e.g., a clutch), and/or performing an operation associated with the individual device 104. In other instances, the user 106 may select the object 110 by moving the shadow onto the object 110 and holding for a predetermined time period (e.g., 3 seconds).

In some instances, if the object orientation 702 is selected, the user may change the orientation of the object 110, as shown in 710. For example, the user may control an orientation of the object 110 by rotating the individual device to a certain degree corresponding to a desired orientation.

In some instances, the object size 704 is selected, the user may change the size of the object 110, as shown in 712. For example, the user may increase a size of the object 110 by moving closer to the display or further away from the display 114 in relation to an initial position of the user 106.

Similarly, if one of the object contrast 706 and the annotation 708 are selected, the user may change a contrast of the object 110 or adding an annotation associated with the object 110, as shown in 714 and 716 respectively.

In some embodiments, features (e.g., semantics) of the object 110 and/or operations associated with the object 110 (e.g., locking operation, and editing operation) may depend on a distance and/or relative body orientation between one or more users, their devices, and the shared display (or other resource). For example, the user 106 may have restricted or limited operations available when facing away from the sensor 116 or the display 114. For example, operations available to the user 106 may be determined based on a distance between the sensor 116 and the user 106 or the individual device 104. For example, operations available to the user 106 may be determined based on an orientation of the user 106 in relation to the sensor 116.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A computer-implemented method for sharing an object, the method comprising:
   receiving, by a shared device from a computing device, an object user-selected at the computing device for copying to the shared device;
   displaying, on a display of the shared device, the object at an initial object position, the initial object position determined using a predetermined rule for a task the shared device is operating;
   detecting, by the shared device and responsive to the receiving the object, a control position of the computing device from which the object was received using one or more cameras of the shared device to track the computing device;

detecting, by the shared device, a change in the control position of the computing device from which the object was received, the change in the control position corresponding to a user input to cause the object to move from the initial object position to an updated object position on the display;

updating, based at least in part on the detecting the user input, the object position of the object presented on the display of the shared device; and locking the object at the updated object position on the display in response to a triggering event.

2. The computer-implemented method of claim 1, further comprising:

establishing, by the shared device and before the receiving of the object, a connection with the computing device based at least in part on a distance between the display and the computing device or an orientation of a user operating the computing device in relation to the display.

3. The computer-implemented method of claim 1, further comprising changing an orientation, contrast, or annotation of the object at the updated object position.

4. The computer-implemented method of claim 1, wherein the one or more cameras operate as a motion sensor to track the computing device.

5. The computer-implemented method of claim 1, further comprising increasing a size of the object on the display responsive to determining the change in the control position of the computing device from which the object was received indicates the computing device has moved closer to the display.

6. The computer-implemented method of claim 1, wherein the initial object position is determined independent of a location of the computing device.

7. A computing device comprising:

one or more processors; and memory that contains instructions storing computer-executable instructions that, responsive to execution on one or more processors, cause the one or more processors to perform acts comprising:

receiving, at the computing device, user selection of an object for copying to a shared device, the user selection comprising an input received via a user interface of the computing device;

transmitting the object from the computing device to the shared device;

transmitting object location information from the computing device to the shared device, the object location information indicating a display location for the object on a display of the shared device in relation to an image displayed on the display of the shared device; and transmitting a command to the shared device, wherein the command causes the shared device to lock the object at a particular object position on the display responsive to an expiration of a predetermined amount of time.

8. The computing device of claim 7, wherein the acts further comprise: receiving a selection a locked object to perform one or more operations on the locked object.

9. The computing device of claim 7, wherein the object location information is determined, based at least in part, on data from a camera of the computing device.

10. The computing device of claim 9, further comprising displaying at the computing device imagery captured by the camera overlaid with an image of the object to be positioned on the shared device;

wherein the transmitting the object location information comprises transmitting the imagery overlaid with the image of the object to the shared device.

11. The computing device of claim 7, wherein transmitting the object location information further comprises transmitting updated object location information.

12. The computing device of claim 7, wherein the predetermined amount of time comprises an amount of time that the computing device has not moved.

13. The computing device of claim 7, wherein the acts further comprise:

establishing a connection with the shared device; and enabling presentation of the object at the particular object position on a user interface implemented by the shared device.

14. The computing device of claim 7, wherein the acts further comprise updating the particular object position after a different predetermined time period.

15. The computing device of claim 7, wherein the transmitting the object to the shared device comprises transmitting, in response to the user selection of the object for copying to the shared device, the object to the shared device.

16. A computing device for sharing an object, the computing device comprising:

one or more processors;

a motion sensor communicatively coupled to one or more processors, and configured to track a mobile device; and memory to maintain a plurality of components executable by the one or more processors, the plurality of components comprising:

a communication module configured to establish a connection with the mobile device, and receive an object from the mobile device, the object having been user-selected at the mobile device for copying to the computing device, a display module configured to display the object at an initial position, the initial position determined based on a task the computing device is operating, a sensor module configured to detect a user input to interact with the object received by the mobile device on a display via a change in a control position of the mobile device from which the object was received using the motion sensor, and a location module configured to update an object position of the object presented on the display in response to the user input, and to lock the object at the object position presented on the display in response to a triggering event.

17. The computing device of claim 16, wherein the display module is further configured to cause presentation of the object at the locked object position on the display after the object is locked.

18. The computing device of claim 16, wherein the plurality of components further comprise an editing module configured to edit the object based at least in part on movement of the mobile device from which the object was received or gestures of the user appendage associated with the mobile device.

19. The computing device of claim 16, wherein the motion sensor is further configured to track multiple mobile devices associated with multiple different users.

20. The computing device of claim 16, wherein the communication module is further configured to receive the triggering event from the mobile device.

\* \* \* \* \*